United States Patent Office 3,236,232
Patented Feb. 22, 1966

3,236,232
ADHESIVE FOR BONDED PLASTER OF
PARIS PRODUCTS
David F. Smith, 120 Grove St., Bay Head, N.J.
No Drawing. Filed Nov. 20, 1962, Ser. No. 239,061
2 Claims. (Cl. 128—91)

This application is a continuation-in-part of my copending application, Serial No. 686,283, filed September 26, 1957 for Plaster of Paris Products expressly abandoned as of Dec. 15, 1962, in favor of continuation-in-part.

The so-called, hard-coated plaster of Paris bandage comprises a flexible backing material, such as gauze, coated with powdered plaster of Paris bonded to itself and to the backing by an adhesive material. The bonding should be such as to prevent loss of plaster from the dry bandage during shipping and handling and also to prevent excessive loss of plaster when the bandage is wet in water and the excess water squeezed out at the point of use. A satisfactory adhesive must thus be relatively insoluble in water. At the same time such adhesive or bonding material must not interfere with the wetting of the bandage since upon immersing in water, a roll of bandage 4 or 6 inches wide by 5 yards long should wet completely through in 5 to 10 seconds. Thus the bonding agent should be water-insoluble but should not cover a large part of the surface of the plaster so as to interfere with its rapid wetting. The bandage roll must be wound fairly tight else it will telescope or otherwise badly deform after wetting and squeezing and will then be difficult to use.

While my invention is directed toward use in bandages employed by orthopedic surgeons to make casts for immobilization and/or support of parts of the animal or human body, it may also be used in making casts of various forms and shapes for other purposes.

Plaster of Paris bandages are made by coating upon the backing material a slurry of powdered plaster of Paris in a liquid of such nature as to prevent setting of the plaster during processing, and then heating the coated backing to remove the slurry liquid. The slurry usually also includes the bonding agent and plaster set-accelerators such as $K_2SO_4$. Such liquid may be methyl, ethyl, propyl or isopropyl alcohol, 90-95 percent aqueous acetic acid, a mixture of methylene chloride and methanol, a mixture of methylene chloride and ethanol, or it may be water containing a plaster set retarder, such, for example, as ammonium borate, ammonium caseinate, $NH_3$, or mixtures of these.

I have found that excellent bonding in such plaster of Paris products can be accomplished by adding to the stirred slurry before it is coated and dried, one or more solutions, such as the following, which contain a relatively water-insoluble adhesive in a solvent that is at least partly soluble in water and in alcohol and in other slurry liquids of the type mentioned above:

(1) Polyvinyl acetate dissolved in the mono-methyl ether of ethylene glycol, dioxane, 90 percent aqueous n-butanol, warm anhydrous n-butanol and mixtures of these solvents or in other solvents that are at least partially soluble in water and alcohols and whose boiling points are within the range of 70–130° C.

(2) Zein dissolved in about 50 percent aqueous isopropyl alcohol, in the monomethyl ether of ethylene glycol, in a mixture of carbon tetrachloride and methanol or in other suitable solvent as described.

When the above solutions are added to the stirred slurry of plaster of Paris in the liquids mentioned above, in which the bonding-material solvent is at least partially soluble but in which the bonding-material is relatively insoluble, the bonding material is so coated upon the plaster particles as not to prevent rapid wetting of them in the final product. Presumably the bonding material under these circumstances is so interspersed with non-solvent as to avoid blocking the plaster particles. The drying temperature used is such as to evaporate the slurry liquid and the bonding-material solvents and soften the bonding material, but not so high as to completely fluidize or liquefy the bonding-material so that it flows over and covers a large part of the surface of the particles. If one were to use finely-divided polyvinyl acetate alone, for example, in the form of a dispersion in a non-solvent—not in solution—a considerably higher drying temperature would be required since one must then incipiently soften the binder itself. But with the solvents I use, the bonding-agent is slightly softened by residues of its solvent left during the later stages of drying so that a lower final temperature may be used. Of course, one must not use, for example, such a low-melting polyvinyl acetate as to soften on the plaster of Paris bandage in hot summer weather for example, in the top of a freight car, truck or warm storage area, so that one is thus limited to using a polyvinyl acetate of softening point above about 110° F. Thus in my process I may use drying temperatures from 160 to 250° F., as against temperatures at least some 20° F. higher when, for example, a solvent for polyvinyl acetate is not used. In the case of zein, the presence of solvent for it is required in any case in order to make it adhesive. I find that much better bonding, without interference with wetting of the final product, is obtained in my process by precipitating the bonding agent in situ upon the plaster or in the slurry liquid than is obtained by simply mixing bonding agent dispersed in a non-solvent with the slurry and, in general, my method is cheaper because it uses less bonding agent and does not involve the expense of making a dispersion of the bonding agent. Also such dispersions normally contain dispersing agents and other materials that are undesirable in a plaster of Paris bandage.

I may also dissolve the polyvinyl acetate or the zein in a warm solvent in which the binder is not appreciably soluble in the cold and add such warm solution to the cold plaster of Paris slurry while stirring same, the cooling and dilution resulting in coating of the bonding agent in situ upon the plaster or in the slurry liquid, presumably very finely interspersed with non-solvent. For example, polyvinyl acetate is soluble in a warm mixture of the glycol ether mentioned above which is diluted with isopropyl alcohol.

While I prefer to add the solution of the bonding material to the plaster slurry, I may instead add it to the plaster slurry liquid before the plaster is added. In addition to polyvinyl acetate, I may use solutions in appropriate solvents (which solvents are at least in part water- and alcohol-soluble) of other water-insoluble adhesives such as acrylate resins, methacrylate resins, polyvinyl chloride and ethyl cellulose which I define collectively as resinous adhesives as distinguished from proteins like zein. It is desirable also that the bonding-material solvent have a boiling-point not more than about 30° C. higher or lower than that of the slurry liquid in order that it be not too difficult to evaporate from the finished product or that it be too rapidly evaporated so as not to leave a slight residue to soften the adhesive towards the end of the drying process. The amounts of such bonding materials I use vary between about 0.3 and about 3 per cent of the plaster by weight. The said aqueous slurry liquids may contain a proportion of methyl, ethyl, propyl or isopropyl alcohol.

As an example of my methods, a slurry of powdered plaster of Paris is made in one of the following liquids (1) methyl, ethyl, propyl or isopropyl alcohol (2) 90 to 95% acetic acid (3) a mixture of methylene chloride in methyl or ethyl alcohol (4) water containing a plaster of Paris set retarder such as ammonium borate, ammonium caseinate, ammonia or mixtures of these. While stirring this slurry, there is added to it a solution of polyvinyl acetate adhesive of melting-point above about 110° F., in one of the following solvents (1) mono-methyl ether of ethylene glycol (2) warm, anhydrous n-butanol (3) n-butanol containing about 10% water (4) dioxane. The amount of this solution of polyvinyl acetate is small compared to the amount of plaster slurry, to provide an amount of polyvinyl acetate equal to 0.3 to 3% of polyvinyl acetate based on the weight of plaster. This mixture of slurry and adhesive solution is then coated on a flexible, porous backing material or formed into a desired shape and then heated to evaporate the volatile material contained therein, leaving a dry, bonded, water-wettable, settable plaster of Paris product in which the finely-divided polyvinyl acetate precipitated by the slurry liquid bonds the plaster to itself and to the backing by having been softened by the minor amount of polyvinyl acetate solvent used; but the adhesive has not been completely melted or dissolved so as to largely cover the surface of the plaster and prevent the rapid wetting of the dry plaster when the final product is subsequently immersed in water preparatory to use.

As a further example of my methods, a slurry of powdered plaster of Paris is made in one of the following liquids (1) methyl, ethyl, propyl or isopropyl alcohol (2) methyl alcohol containing about 10% water (3) water containing a plaster set retarder such as ammonium borate, ammonium caseinate, ammonia or mixtures of these retarders. While stirring this slurry, there is added to it a solution of zein in one of the following solvents (1) 50% aqueous isopropyl alcohol (2) mono-methyl ether of ethylene glycol (3) dioxane (4) n-butanol containing about 10% water (5) warm, anhydrous n-butanol; the zein solution being in amount small compared to the amount of slurry, such as to provide 0.3 to 3.0% zein based on the weight of plaster. The mixture of slurry and zein solution is coated on a flexible, porous backing material or formed into a desired shape and heated to evaporate the volatile material and leave a dry, bonded, settable, rapidly water-wettable plaster of Paris product.

Another useful adhesive for plaster of Paris products that are made through the use of a slurry of plaster in methanol containing less than about 10 percent water, are the solid polyglycols such as polyethylene, methoxypolyethylene and polypropylene glycols of molecular weight high enough to be not rapidly soluble in water but not so high that they become insoluble in the methanol or not water-wettable. Such, for example, are polyglycols of average molecular weight from about 4000 to 20,000 which I designate as of intermediate molecular weight, and I use from 0.3 to 3 percent of them by weight of the plaster of Paris.

What I claim is:

1. In a process for making a bonded plaster of Paris bandage which includes in succession the steps of making a slurry of powdered plaster of Paris in a liquid selected from the class consisting of methanol, ethanol, propanol, isopropanol, a mixture of methylene chloride and methanol, a mixture of methylene chloride and ethanol, and water containing a plaster of Paris set inhibitor selected from the class consisting of ammonium borate, ammonium caseinate, ammonia, and mixtures thereof, adding an adhesive solution to said slurry, while stirring same, coating said slurry mixed with said adhesive solution on a flexible backing material and heating said coated backing material; the steps of adding to said slurry, while stirring same, an adhesve comprising a minor proportion of a solution of zein in a solvent selected from the class consisting of about 50 percent aqueous isopropanol, the mono-methyl ether of ethylene glycol, a mixture of carbon tetrachloride and methanol, the amount of said solution being such as to provide between 0.3 and 3 percent of zein based on the coating a flexible backing material with the mixture of slurry and solution, weight of plaster of Paris. and heating the so-coated backing material to a temperature between about 160° F. and about 250° F. so as to evaporate substantially all of said liquid and said solvent and leave a dry, bonded, wettable, settable plaster of Paris bandage.

2. The process of claim 1 wherein the said adhesive solution is added to said slurry liquid before the plaster of Paris is mixed with said liquid.

References Cited by the Examiner

UNITED STATES PATENTS

| | | | |
|---|---|---|---|
| 2,316,467 | 4/1943 | Sturken | 106—153 |
| 2,360,081 | 10/1944 | Stewert | 106—153 |
| 2,557,083 | 6/1951 | Eberl | 106—114 |
| 2,655,148 | 10/1953 | Eberl et al. | 117—169 |
| 2,842,138 | 7/1958 | Billings et al. | 106—111 |
| 3,114,738 | 12/1963 | Kominami et al. | 260—89.1 |

MORRIS LIEBMAN, *Primary Examiner.*

A. O. DENT, L. T. JACOBS, *Assistant Examiners.*

UNITED STATES PATENT OFFICE
CERTIFICATE OF CORRECTION

Patent No. 3,236,232                      February 22, 1966

David F. Smith

It is hereby certified that error appears in the above numbered patent requiring correction and that the said Letters Patent should read as corrected below.

Column 4, line 25, strike out "and heating the so coated backing material to a tempera-"; line 29, strike out "weight of plaster of Paris," and insert the same after "on the" in line 28, same column 4.

Signed and sealed this 17th day of January 1967.

(SEAL)

Attest:

ERNEST W. SWIDER                      EDWARD J. BRENNER

Attesting Officer                        Commissioner of Patents